US012722184B2

(12) United States Patent
Hege et al.

(10) Patent No.: US 12,722,184 B2
(45) Date of Patent: Sep. 1, 2026

(54) DIRECTIONAL AIR KNIFE

(71) Applicant: A. G. Stacker Inc., Weyers Cave, VA (US)

(72) Inventors: Dalton Hege, Weyers Cave, VA (US); Eric Stempihar, Rockingham, VA (US); Robert Knupp, Staunton, VA (US); Joseph Wunder, Lexington, VA (US); Randall Donn Senger, Mount Sidney, VA (US)

(73) Assignee: A. G. Stacker Inc., Weyers Cave, VA (US)

( * ) Notice: Subject to any disclaimer, the term of this patent is extended or adjusted under 35 U.S.C. 154(b) by 560 days.

(21) Appl. No.: 18/468,921

(22) Filed: Sep. 18, 2023

(65) Prior Publication Data

US 2024/0091813 A1 Mar. 21, 2024

Related U.S. Application Data

(60) Provisional application No. 63/408,291, filed on Sep. 20, 2022.

(51) Int. Cl.
*B07B 4/00* (2006.01)
*B07B 13/16* (2006.01)

(52) U.S. Cl.
CPC ................ *B07B 4/00* (2013.01); *B07B 13/16* (2013.01)

(58) Field of Classification Search
CPC .................................. B07B 4/00; B07B 13/16
USPC .................................................. 198/494, 495
See application file for complete search history.

(56) References Cited

U.S. PATENT DOCUMENTS

| | | | | |
|---|---|---|---|---|
| 6,742,285 B2 | 6/2004 | Shepard | | |
| 9,480,282 B2 | 11/2016 | Levy | | |
| 11,920,863 B2 * | 3/2024 | Uchida | ..................... | F26B 3/04 |
| 2003/0115709 A1 * | 6/2003 | Haruch | ................... | F26B 21/50 15/309.2 |
| 2009/0050153 A1 * | 2/2009 | Brunner | .............. | A61M 16/024 128/204.23 |

FOREIGN PATENT DOCUMENTS

| | | |
|---|---|---|
| CN | 111842860 A | 10/2020 |
| CN | 113446840 A | 9/2021 |
| CN | 113532090 A | 10/2021 |
| CN | 113899195 A | 1/2022 |
| GB | 129737 A | 7/1919 |
| JP | 2009133525 A | 6/2009 |
| KR | 20070119398 A | 12/2007 |
| KR | 20090053546 A | 5/2009 |

* cited by examiner

*Primary Examiner* — Gene O Crawford
*Assistant Examiner* — Lester Rushin, III
(74) *Attorney, Agent, or Firm* — J-TEK LAW PLLC; Jeffrey D. Tekanic; Scott T. Wakeman

(57) ABSTRACT

An air knife includes a tubular housing having first and second longitudinally spaced ends, a side wall, an interior, and an aperture configured to be connected to a source of pressurized air. The side wall includes at least one opening, and a nozzle is mounted at the at least one opening, the nozzle including a nozzle inlet in fluid communication with the at least one opening, a nozzle outlet spaced from the nozzle inlet, and a nozzle interior. A plurality of baffles are located in the nozzle interior, each of the baffles having a first end at the nozzle inlet and a second end at the nozzle outlet, and the second end of each of the baffles is longitudinally offset from the first end of each of the baffles.

20 Claims, 15 Drawing Sheets

DIRECTIONAL AIR KNIFE

CROSS-REFERENCE

The present application claims the benefit of U.S. Provisional Patent Application No. 63/408,291, filed Sep. 20, 2022, the entire contents of which are hereby incorporated by reference.

TECHNOLOGICAL FIELD

The present disclosure is directed to an air knife having baffles or other structure to change the direction of air exiting the air knife.

BACKGROUND

Air knives are known that comprise a tube having a slit-like opening. Pressurized air is fed into the tube from a blower or source of compressed air so that the air exits the opening in a sheet at high speed. Such air knives are commonly used to clean and/or dry materials moving past the air knife on a conveyor. U.S. Pat. No. 6,742,285, which is incorporated herein by reference, shows a general example of an air knife.

Air knives are currently used above conveyors to dislodge scrap from sheets of material, such as paperboard, carried by the conveyors. These air knives are mounted across the conveyor so that they extend perpendicular to the direction of sheet movement along the conveyor. Air knives mounted in this manner tend to blow scrap toward the entrance to the conveyor, but due to the small spacing between the sheets on the conveyor, they do not always blow the scrap off the sheets. Instead, scrap may be blown backward onto upstream sheets. Mounting an air knife at an angle to the sheet travel direction as shown in U.S. Pat. No. 6,742,285 for example, might be useful in some circumstances; however, in many conveyors there is no room to mount an air knife as taught in this reference.

SUMMARY

The air knife of the present disclosure is intended to be used in a conveyor for moving sheets of corrugated paperboard from a die cut machine to a stacker. The air knife is configured to blow scrap at an angle to the sheet travel direction while the air knife itself is mounted substantially perpendicular to the sheet travel direction. This is accomplished by providing air guides or baffles in or at the opening of the air knife to direct air exiting the air knife at an angle to the sheet travel direction. Optionally, the baffles may be movable to change the angle of the exiting air.

A first aspect of the disclosure is an air knife comprising a tubular housing having a first end, a second end spaced from the first end in a longitudinal direction, a side wall extending from the first end to the second end, an interior, and an aperture configured to be connected to a source of pressurized air to increase a pressure of air inside the tubular housing. There is at least one opening in the side wall of the housing, and a nozzle is located at the at least one opening. The nozzle has a nozzle inlet in fluid communication with the at least one opening, a nozzle outlet spaced from the nozzle inlet, and a nozzle interior. A plurality of baffles are located in the nozzle interior, each of the baffles having a first end at the nozzle inlet and a second end at the nozzle outlet. The tubular housing is divided into a first half and a second half by an imaginary plane perpendicular to the longitudinal direction, and the second end of each of the baffles is longitudinally offset from the first end of each of the baffles.

Another aspect of the disclosure is an air knife comprising a tubular housing having a first end, a second end spaced from the first end in a longitudinal direction, a side wall extending from the first end to the second end, an interior, and an aperture configured to be connected to a source of pressurized air to increase a pressure of air inside the tubular housing. There is at least one opening in the side wall of the housing, and a nozzle is located at the at least one opening. The nozzle has a nozzle inlet in fluid communication with the at least one opening, a nozzle outlet spaced from the nozzle inlet, and a nozzle interior. A plurality of baffles are located in the nozzle interior, each of the baffles having a first end at the nozzle inlet and a second end at the nozzle outlet. The tubular housing is divided into a first half and a second half by an imaginary plane perpendicular to the longitudinal direction, and the baffles are configured such that when the pressure of the air inside the tubular housing is greater than a pressure of air outside the tubular housing air exits the nozzle outlet at an acute angle relative to the plane.

DETAILED DESCRIPTION

Figure 1:
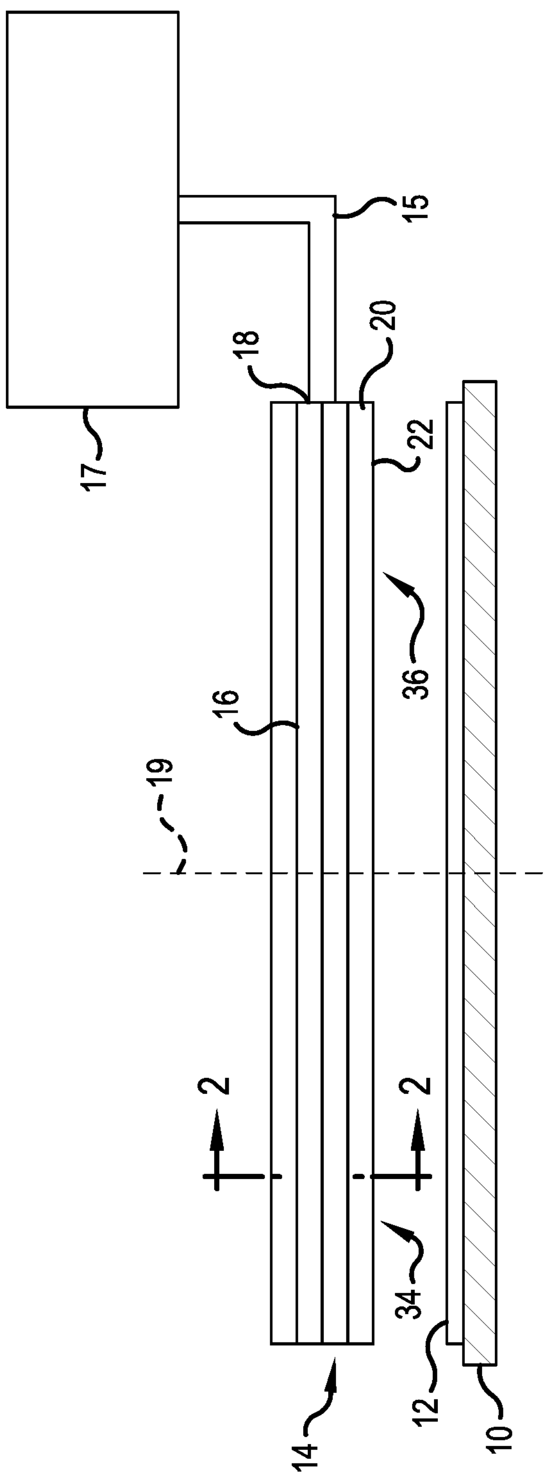
FIG. 1 is a end elevational view, partly in section, of a sheet of material supported by a conveyor beneath an air knife having a nozzle according to a first embodiment of the present disclosure.

Referring now to the drawings, wherein the showings are for purposes of illustrating presently preferred embodiments of the present invention and not for the purpose of limiting same, and wherein FIGS. 2-35 are drawn to scale, FIG. 1 shows a conveyor 10 supporting a sheet of material 12, such as corrugated paperboard, as it passes beneath an air knife 14. The conveyor 10 moves in a downstream or sheet-transport direction, and the air knife 14 is mounted perpendicular to the sheet transport direction. That is, the length direction or longitudinal direction of the air knife is perpendicular to the downstream direction.

The air knife 14 includes a tubular housing 16 connected to a blower 17 or other source of pressurized air by a single connector 15 attached to an aperture 18 in the tubular housing 16 as illustrated in FIG. 1. In the alternative (not illustrated), the source of pressurized air may be connected to both ends of the tubular housing. As used herein, "source of pressurized air" can mean a fan or blower 17 for driving air into the tubular housing 16 to increase the air pressure inside the tubular housing or a cylinder of compressed air (not illustrated) connected to the tubular housing to increases the pressure in the tubular housing 16. The tubular housing 16 is divided into two halves by an imaginary plane 19 perpendicular to the longitudinal direction of the tubular housing.

Figure 2:
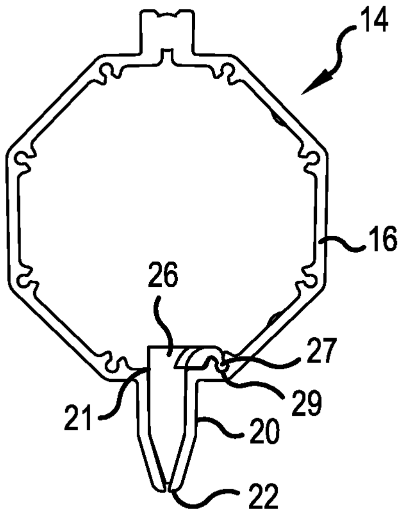
FIG. 2 is a sectional view taken in the direction of line 2-2 in FIG. 1.

As shown in FIG. 2, the housing 16 includes an elongated nozzle 20 having a nozzle inlet 21 in fluid communication with the interior of the housing 16 and a slit-shaped nozzle outlet 22 through which pressurized air passes before impacting against the sheet of material 12 on the conveyor 10. In this embodiment, the nozzle 20 and the housing 16 are formed as one piece. The relatively narrow width of the nozzle outlet 22, which is narrower than the width of the nozzle inlet 21, increases the speed of the air exiting the air knife 10 to form a sheet of air that impacts against the sheet of material 12 and dislodges scrap resting on the sheet of material 12. A second air knife (not illustrated) may also be provided below the conveyor 10 to blow air on the conveyor bottom (assuming the conveyor is formed from multiple parallel belts or has gaps or openings) to dislodge scrap attached to the bottoms of the sheets of material 12. The second air knife may be identical to the first air knife and will not be further described.

For the air knife of the present disclosure, the speed and volume of air emitted from the nozzle 20 should be sufficiently high that loose and partially attached chads (scrap material partially attached to the sheets of material on the conveyor 10) can be moved to the sides of the conveyor without damaging the sheets of material themselves.

The housing 16 and the nozzle 20 preferably extend perpendicular to the sheet transport direction, and the nozzle 20 may be tilted (that is, the housing 16 may be rotated around its longitudinal axis) so that the nozzle 20 faces upstream at an angle of, for example, 30 degrees while the longitudinal direction of the nozzle 20 remains perpendicular to the sheet transport direction. It is sometimes desirable to direct the nozzle 20 at an angle to the sheet transport direction (so that the housing 16 is not perpendicular to the sheet transport direction) to impart transverse movement to scrap on the sheets of material 12 to better move the scrap toward and/off the edges of the sheets of material 12. This can be done by mounting the entire housing 16 at an angle to the sheet transport direction; however, many conveyors do not have sufficient space to allow for an angled mounting. Embodiments of the present disclosure address this problem by providing baffles or vanes to direct the air exiting the housing 16 at an angle to the sheet transport direction while the housing of the air knife remains perpendicular to the sheet transport direction.

Figure 3:
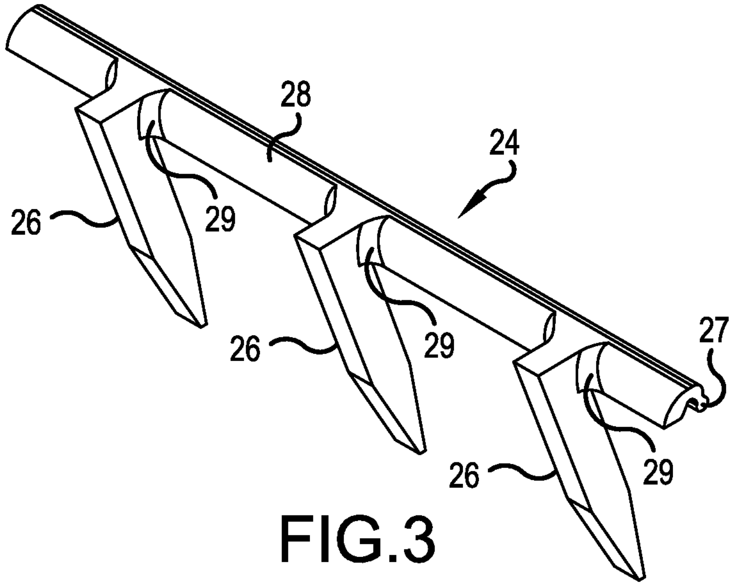
FIG. 3 is a perspective view of a first embodiment of a baffle assembly mountable in the nozzle of the air knife of FIG. 1.
Figure 4:
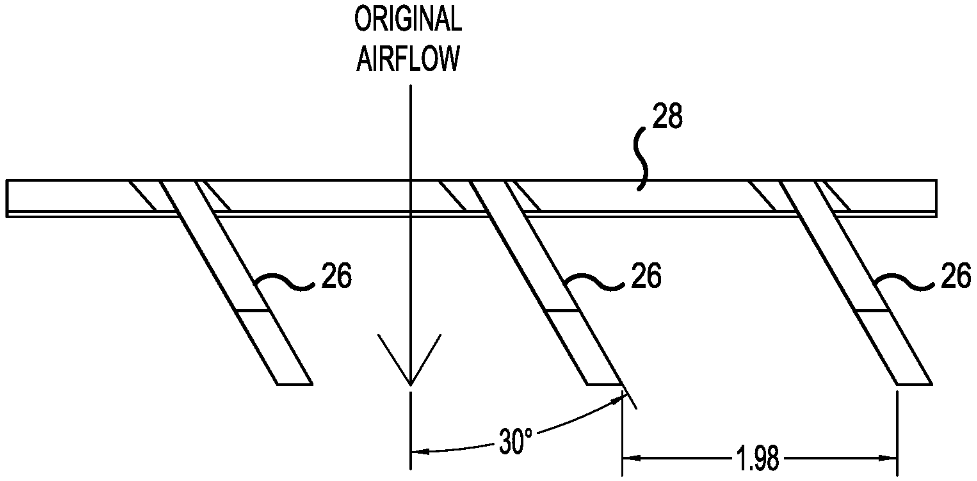
FIG. 4 is an elevational view of the baffle assembly of FIG. 3.
Figure 5:
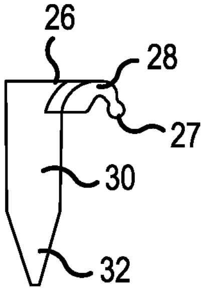
FIG. 5 is an elevational view of one of the baffles of the baffle assembly of FIG. 4.
Figure 6:
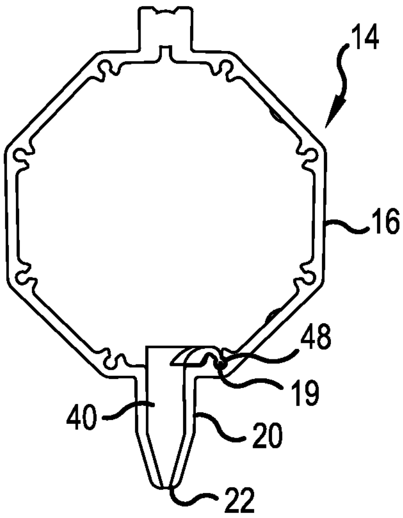
FIG. 6 is a sectional view through an air knife according to a second embodiment of the present disclosure.
Figure 7:
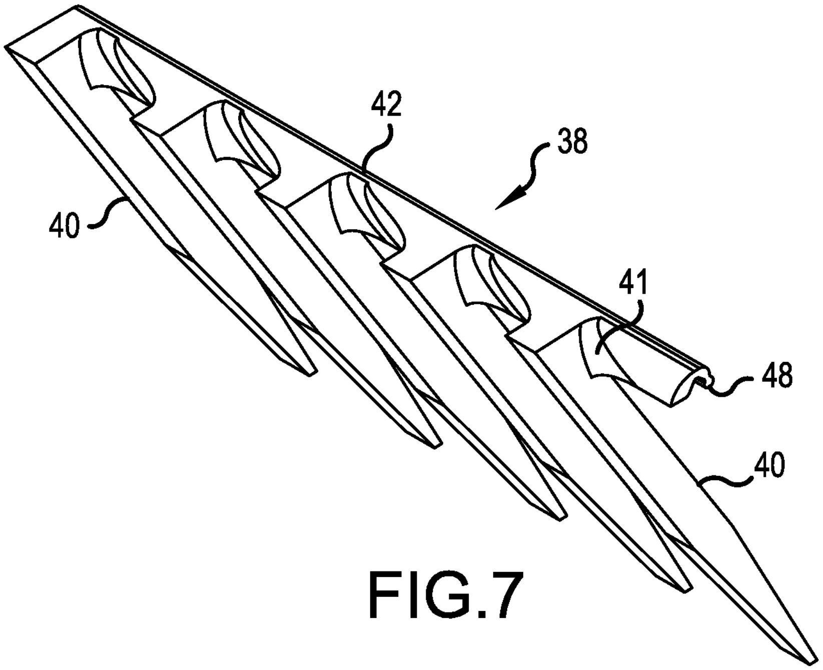
FIG. 7 is a perspective view of a baffle assembly of the air knife of FIG. 6.
Figure 8:
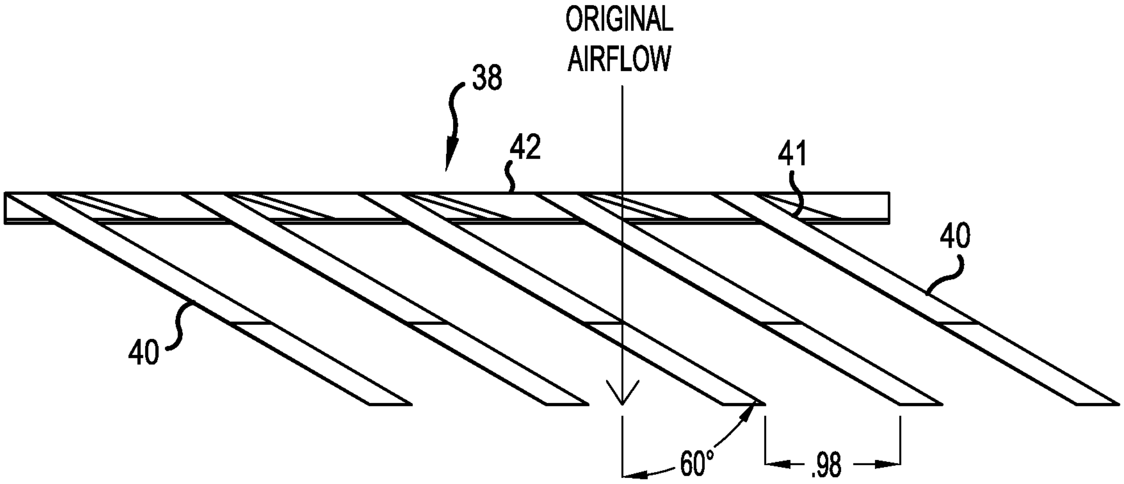
FIG. 8 is an elevational view of the baffle assembly of FIG. 7.
Figure 9:
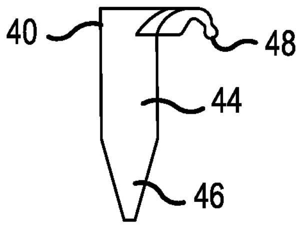
FIG. 9 is an elevational view of one of the baffles of the baffle assembly of FIG. 7.

In a first embodiment, at least one baffle assembly 24, which includes a plurality of individual baffles 26, is provided in the interior of the nozzle 20 with a first end of each baffle located near the nozzle inlet 21 and a second end of each baffle near the nozzle outlet 22. The baffles 26 may be located entirely inside the nozzle 20; in the alternative, the first ends of the baffles may extend into the interior of the tubular housing 16 and/or the second ends of the baffles may project out of the nozzle outlet 22. The sectional view of FIG. 2 shows one of the baffles 26, and FIGS. 3 and 4 show the baffles 26 supported by a common baffle support member 28.

Each of the baffles 26 includes a main portion 30 and a tapered distal portion 32 which is shaped to conform to the interior of the nozzle 20 and span a portion of the interior so that air from the housing 16 exits the air knife 10 between adjacent pairs of the baffles 26. The baffle support member 28 includes a profiled bead 27 configured to be received in a channel 29 in the interior of the housing 16 to secure the baffle assembly 24 in a desired position and orientation relative to the nozzle outlet 22. If the baffles 26 were not present, air exiting the nozzle 20 would flow perpendicular to the longitudinal axis of the housing 16 (the original air exit direction). The baffles 26 are shaped such that the second end of each baffle is longitudinally offset from the first end of each baffle and thus angled such that air exiting the air knife 14 flows toward one side (if all baffles are angled in the same direction) or both sides (if two sets of the baffles 26 are angled in opposite direction) of the air knife 10 and thus toward one or both sides of a centerline of the conveyor 10. In some cases, the baffles 26 can be curved instead of flat as illustrated. When flat baffles 26 are discussed, the baffles may be described as being “angled” relative to an original airflow direction perpendicular to the longitudinal center line of the tubular housing 16; this disclosure applies to curved baffles as well.

The baffle assembly 24 is preferably formed from plastic, but can also be formed from metal or other materials. In particular when formed from plastic, the baffle assembly 24 can be 3D printed or formed by another additive manufacturing process. In addition, conventional molding methods can be used.

The number and spacing of the baffles 26 can vary as can the angle of the baffles 26 relative to the original air exit direction. FIG. 4 shows the baffles 26 making a 30 degree angle relative to the original air exit direction; however, the baffles 26 may be directed at angles of about 30 to 60 degrees relative to the original exit direction. The angle selected may be based on the amount of air flow through the nozzle 20 and/or the amount and/or type of scrap that needs to be dislodged from the sheets of material 12. Larger or smaller numbers of baffles may also be used.

Referring again to FIG. 1, the baffles 26 can be arranged such that they are all angled toward one side of the conveyor 10—to the right in FIG. 1, for example. However, preferably, a first set 34 of the baffles 26 is angled away from the center plane 19 of the air knife 14 toward the left side of the conveyor 10, and a second set 36 of the baffles 26 is angled away from the center plane 19 of the air knife 14 toward the right side of the conveyor 10. With this configuration, scrap on the upper surface of the sheet of material 12 only needs to be moved at most across half the width of the sheet of material 12 before falling off a side edge. The baffles 26 each include a curved portion 29 where they connect to the baffle support member 28 to help guide air into the spaces between the baffles 26. The length of the curved portion 29 can be made longer or, optionally, the baffle 26 itself can be curved along some or all of its length.

FIGS. 6-9 show a second embodiment of a baffle assembly 38 mounted in the tubular housing 16 which includes a plurality of individual baffles 40 attached to a common baffle support member 42 with a curved air guide wall 41 provided at the connection of each of the baffles 40 and the baffle support member 42. The baffles 40 are angled at 60 degrees relative to the original exit direction of air from the nozzle 20 and are more closely spaced (e.g., by about 1 inch) than the baffles 26 of the baffle assembly 24 of the first embodiment (which are spaced by about 2 inches). Each of the baffles 40 includes a main portion 44 and a tapered distal portion 46 which are shaped to conform to and span the interior of the nozzle 20. The baffle support member 42 includes a profiled bead 48 that is receivable in the channel 29 inside the housing 16 to hold the baffle assembly 38 in position.

Figure 10:
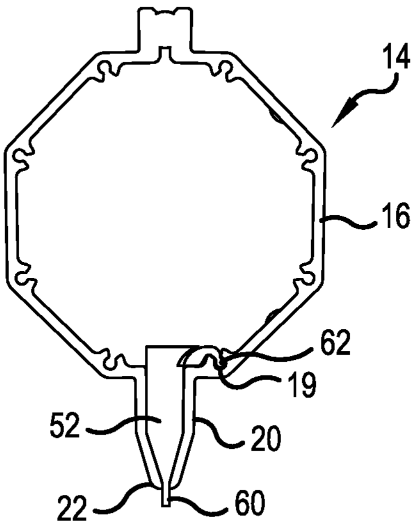
FIG. 10 is a sectional view through an air knife according to a third embodiment of the present disclosure.
Figure 11:
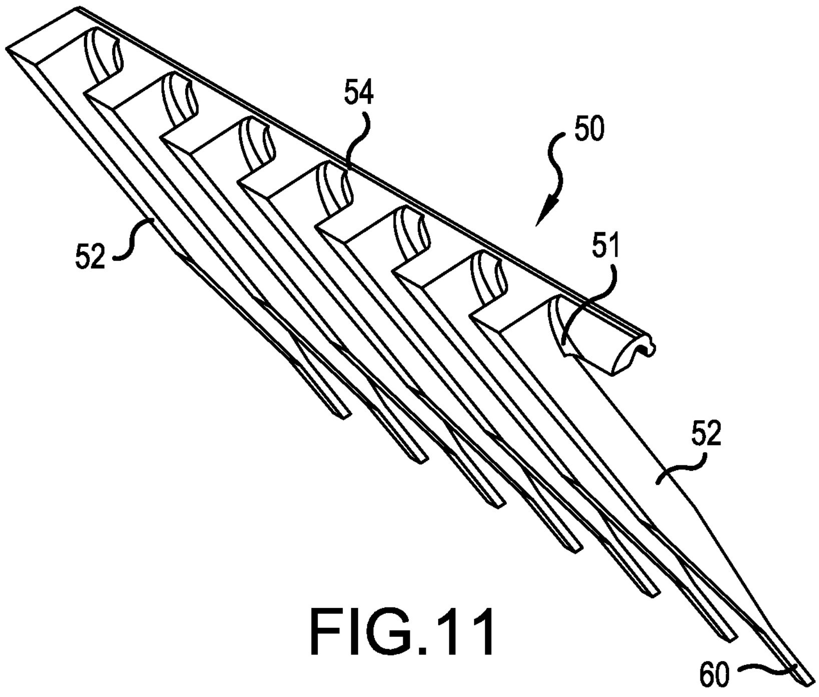
FIG. 11 is a perspective view of the baffle assembly of FIG. 10.
Figure 12:
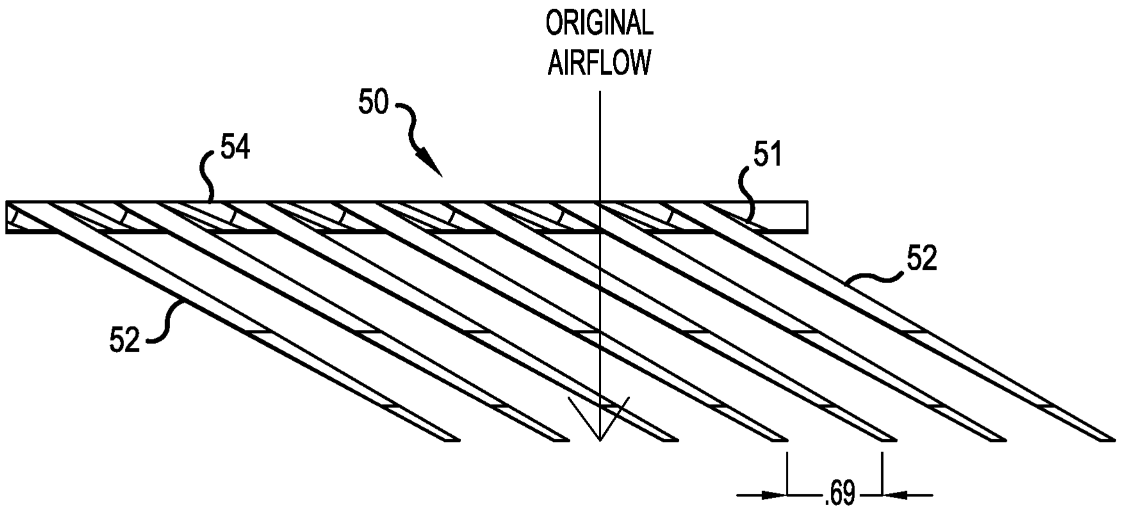
FIG. 12 is an elevational view of the baffle assembly of FIG. 11.
Figure 13:
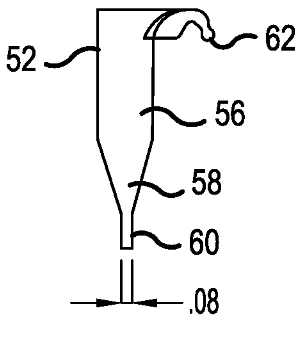
FIG. 13 is an elevational view of one of the baffles of the baffle assembly of FIG. 11.
Figure 14:
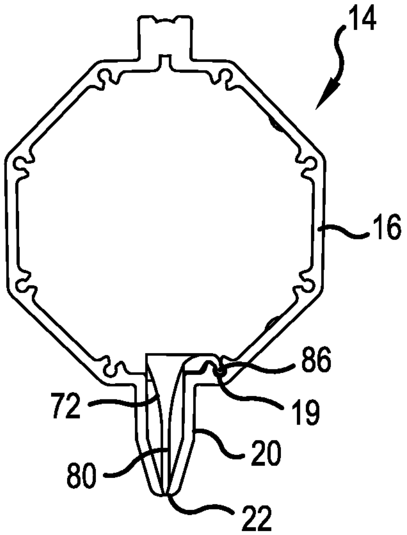
FIG. 14 is a sectional view through an air knife according to a fourth embodiment of the present disclosure.
Figure 15:
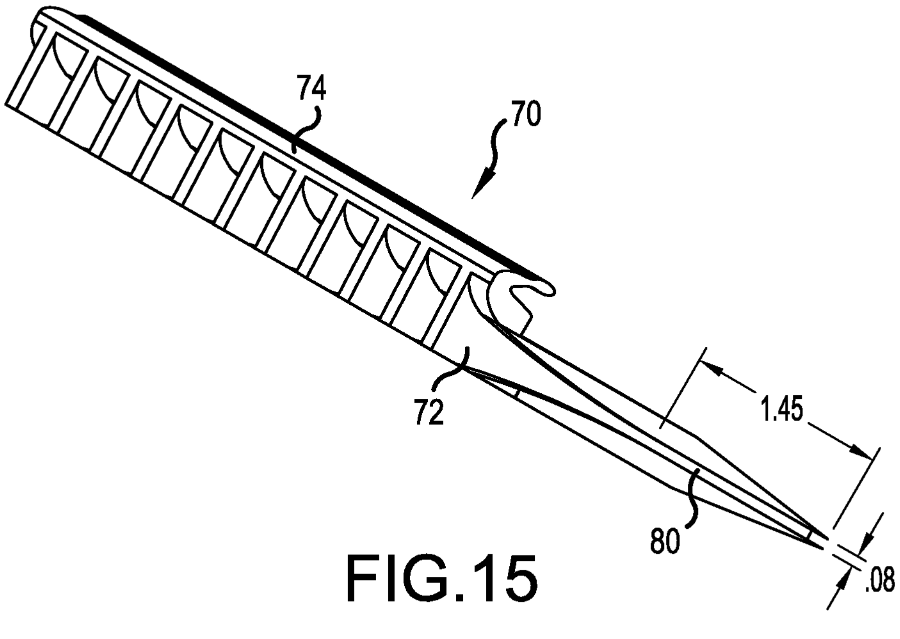
FIG. 15 is a perspective view of the baffle assembly of FIG. 14.
Figure 16:
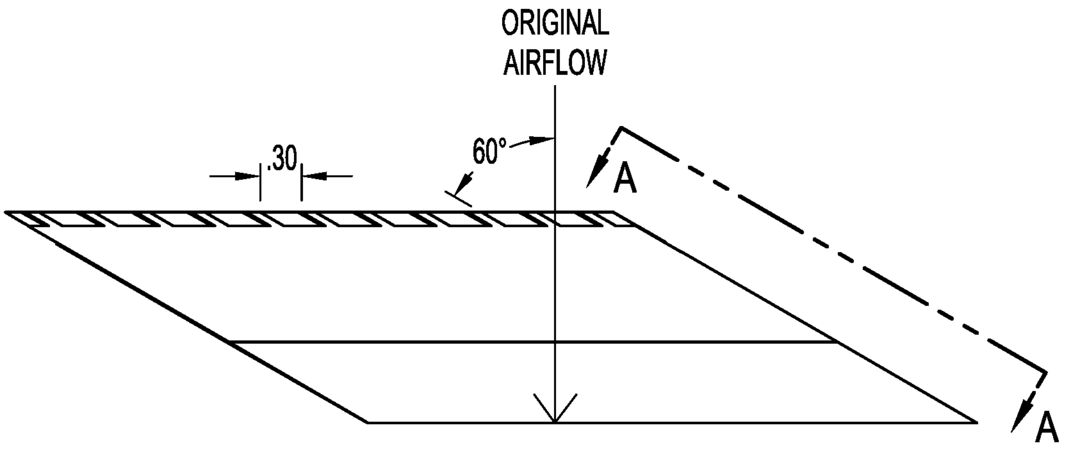
FIG. 16 is an elevational view of the baffle assembly of FIG. 15.

FIGS. 10-13 show a third embodiment of a baffle assembly 50 mounted in the tubular housing 16 which assembly includes a plurality of individual baffles 52 attached to a baffle support member 54 with a curved air guide wall 51 at the connection of each baffle 52 to the support member 54. The baffles 52 are angled at about 60 degrees to the original exit direction of air from the nozzle 20 and are more closely spaced (by about 0.69 inches) than the baffles 26 and 40 of the first and second embodiments. Each of the baffles 52 has a main body portion 56 and a tapered distal portion 58, and the baffles 52 are shaped to conform to and span the interior of the nozzle 20. Furthermore, in this embodiment, the tips 60 of the distal portions 58 of the baffles 52 project through the nozzle outlet 22 as shown in FIG. 10, which may sometimes provide improved directional control of the air flow. The baffle support member 54 also includes a profiled bead 62 that is receivable in the channel 29 in the housing 16 to hold the baffle assembly 50 in place.

FIGS. 14-17 show a fourth embodiment of a baffle assembly 70 that includes a plurality of individual baffles 72 attached to a baffle support member 74 and mounted in the tubular housing 16 at a space of about 0.3 inches. The baffles 72 are angled at about 60 degrees to the original air exit direction from the nozzle 20. Each of the baffles 72 has a main body portion 76 and a tapered distal portion 78 shaped to span the width of the nozzle 20. Each of the baffles 72 also includes a center rib 80 on one side thereof which rib 80 includes a tapering upper portion 82 and a thin lower portion 84 having a substantially constant width. The rib 80 may help to improve the uniformity of air flow exiting the slit 22. The baffle support member 74 also includes a profiled bead 86 that is received in the channel 29 of the housing 16 to hold the baffle assembly 70 in place.

Figure 20:
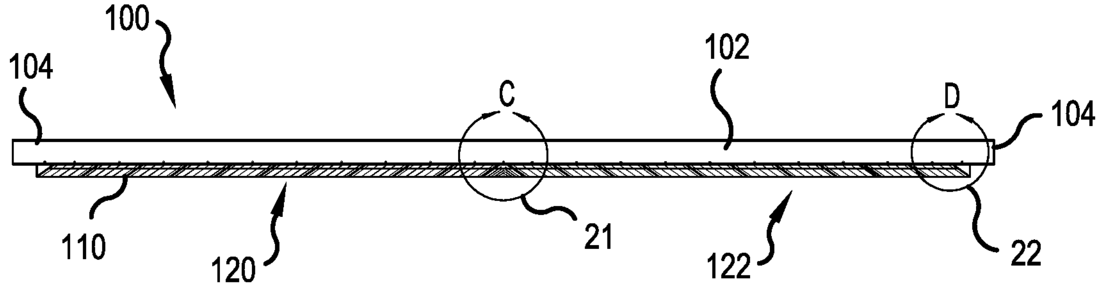
FIG. 20 is a sectional view taken in the direction of line 20-20 in FIG. 19.
Figure 21:
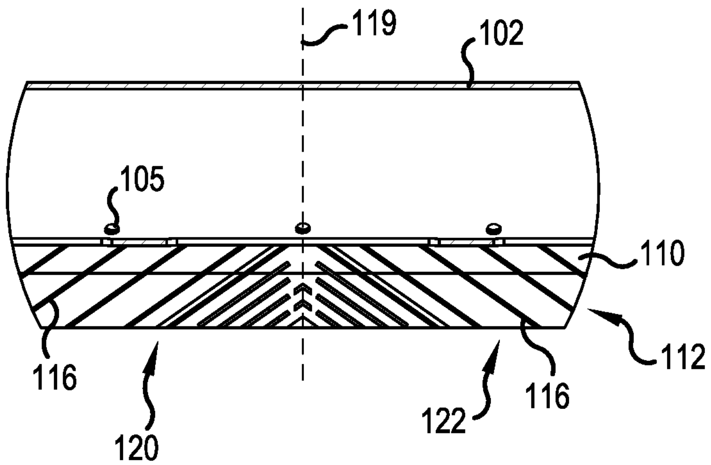
FIG. 21 is a detail view of region 21 in FIG. 20.

FIGS. 18-33 show a second embodiment of an air knife 100 according to the present disclosure. In this embodiment, as can be seen in FIGS. 20 and 21, for example, baffles are formed in a nozzle structure that is attached to a tubular housing rather than being located in a nozzle 20 that is formed integrally with a housing 16 as shown in the first embodiment. Referring now to the air knife 100 of FIG. 18, (shown in perspective view in FIG. 23 and exploded in FIG. 24), the air knife 100 includes a tubular housing 102 having longitudinally spaced ends 104 either or both of which includes an aperture 103 that is connectable to a blower or other source of pressurized air (not illustrated). The housing 102 includes a plurality of holes 105 (FIG. 21) or slots 106 (FIG. 24) in its cylindrical side wall 108, but a single slot 106 or a greater or lesser number of holes 105 and/or slots 106 could be provided. The slots 106 allow pressurized air to exit the housing 102.

A nozzle 110 is connected to the housing 102 such that the slots 106 of the housing are in fluid communication with an interior 112 of the nozzle 110. The nozzle 110 may be attached to the housing 102 by a plurality of screws 114 as illustrated in the drawings or by welding or the use of an adhesive or other suitable fastening method. Baffles 116 inside the nozzle 110 direct air exiting the nozzle 110 at an angle to the sheet transport direction. That is, if the baffles 116 were not present, air would exit through the nozzle outlet 118 at the end of the nozzle 110 in a direction perpendicular to the longitudinal direction of the housing 102; the baffles 116 direct the exiting air at an angle to that perpendicular direction. The baffles 116 are preferably molded from the same material used to form the nozzle 110; in the alternative, they can be attached to or formed on the surface of the nozzle after the nozzle 110 is produced.

Figure 17:
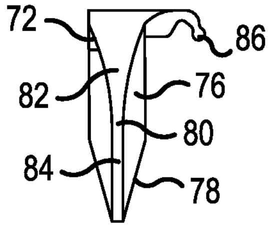
FIG. 17 is an elevational view of one of the baffles of the baffle assembly of FIG. 15.
Figure 18:
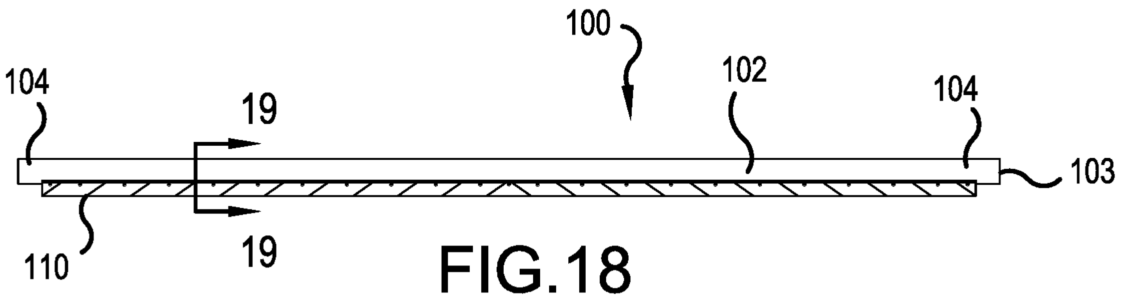
FIG. 18 is an elevational view of a fifth embodiment of an air knife according to the present disclosure.
Figure 19:
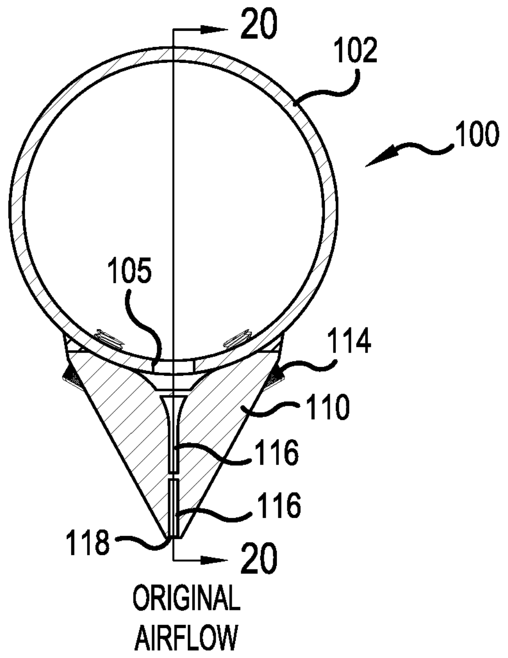
FIG. 19 is a sectional view taken in the direction of line 19-19 in FIG. 18.
Figure 22:
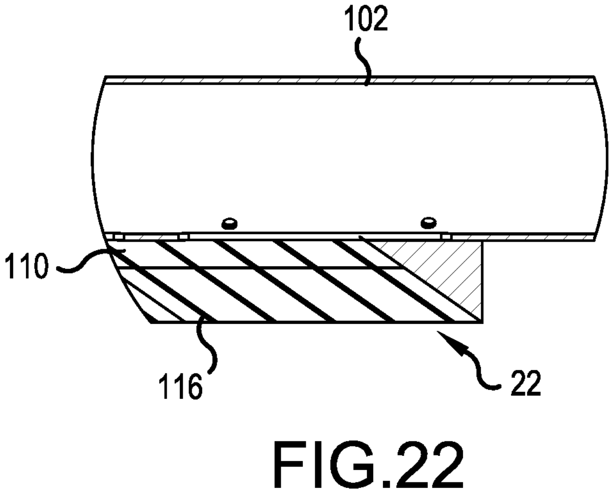
FIG. 22 is a detail view of region 22 in FIG. 20.
Figure 23:
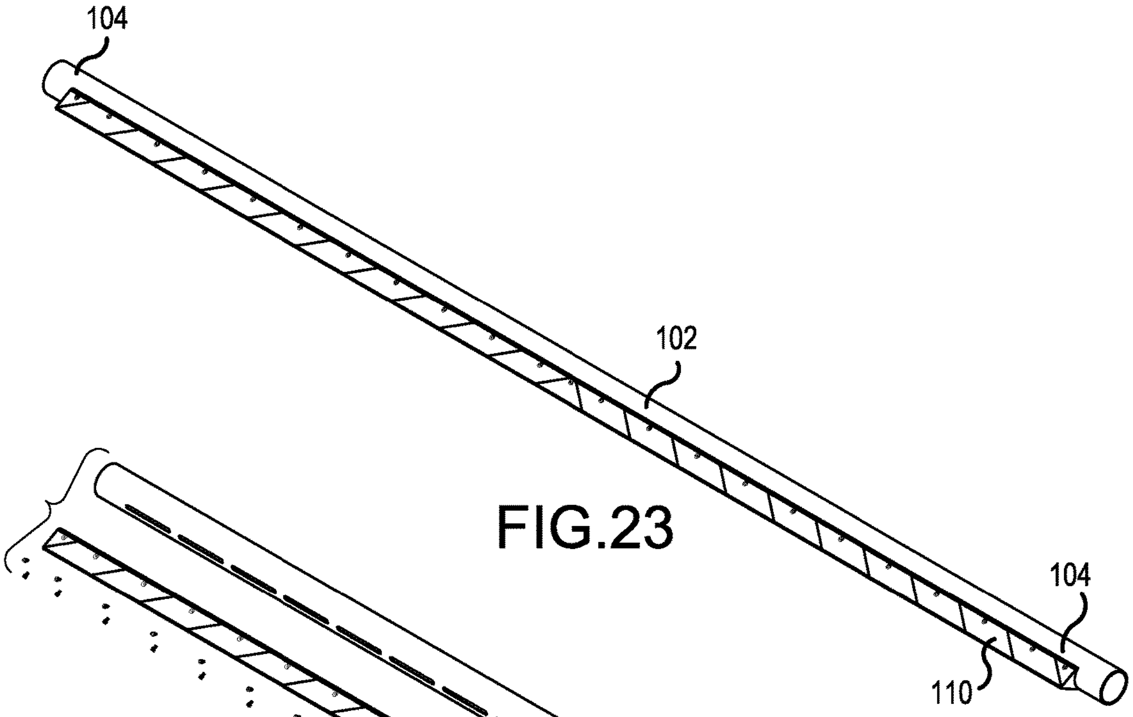
FIG. 23 is a perspective view of the air knife of FIG. 18.
Figure 24:
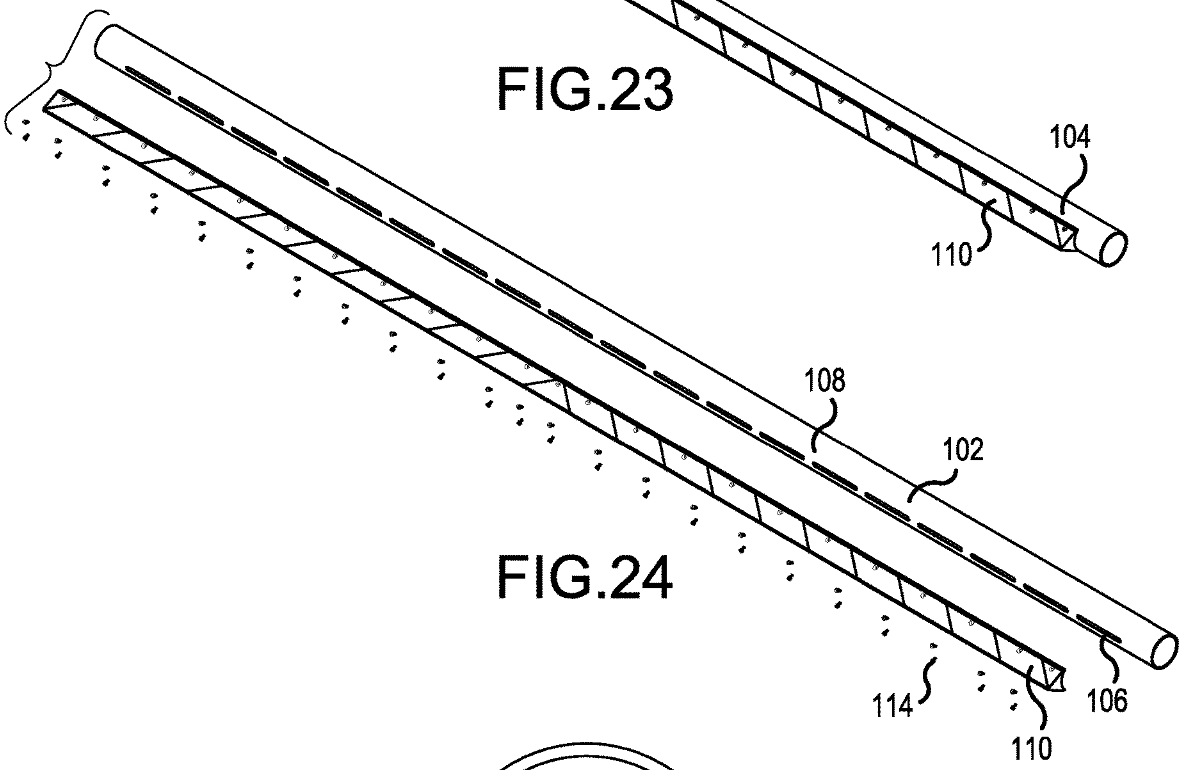
FIG. 24 is an exploded view of the air knife of FIG. 23.
Figure 25:
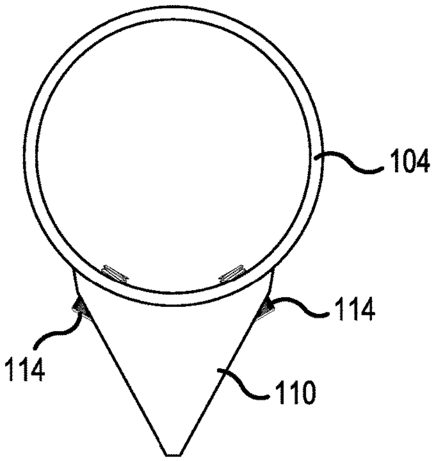
FIG. 25 is an end elevational view of the air knife of FIG. 23.
Figure 26:
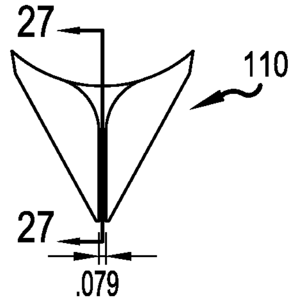
FIG. 26 is a sectional view of a first baffle configuration for the nozzle of the air knife of FIG. 18.
Figure 27:
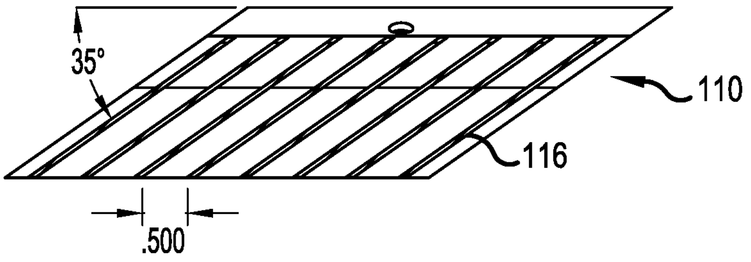
FIG. 27 is a view taken in the direction of line 27-27 in FIG. 26.
Figure 28:
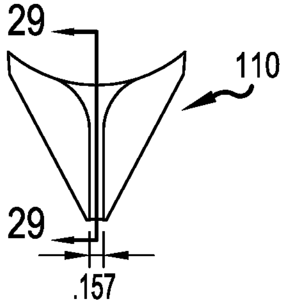
FIG. 28 is a sectional view of a second baffle configuration for the nozzle of the air knife of FIG. 18.
Figure 29:
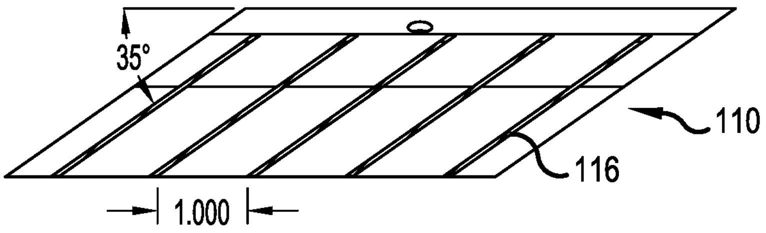
FIG. 29 is a view taken in the direction of line 29-29 in FIG. 28.
Figure 30:
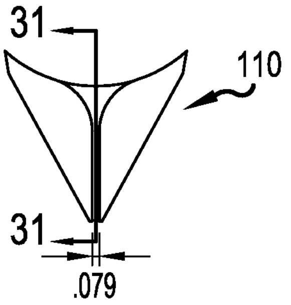
FIG. 30 is a sectional view of a third baffle configuration for the nozzle of the air knife of FIG. 18.
Figure 31:
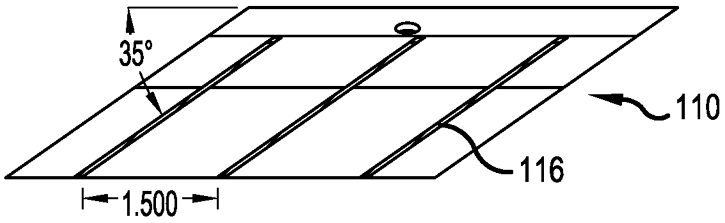
FIG. 31 is a view taken in the direction of line 31-31 in FIG. 30.
Figure 32:
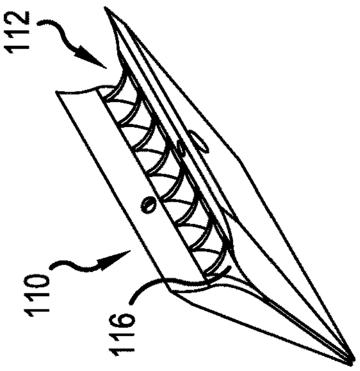
FIG. 32 is a perspective view of the external air guide of FIG. 18.

Referring now to FIG. 21, which shows a detail of the portion of the nozzle 110 located in the center of the housing 102, a first set 120 of the baffles 116 are angled to the left of the center plane 119 in the figure while a second set 122 of the baffles 110 are angled to the right of the center plane 119. FIG. 22, a detail view of the right end of the nozzle 110 of FIG. 17, show baffles 116 of the second set 122 of baffles. The nozzle 110 thus emits streams of air in opposite directions, away from the center plane 119 of the air knife 100 to blow scrap toward the opposite sides of sheets of material 12 on a conveyor beneath the air knife 100. The baffles 116 could alternately be angled to direct exiting air toward the center plane 119 of the of the air knife 100, for example, if two sheets are being carried along the conveyor with a gap in between the sheets or if another reason exists to move scrap toward the center of the conveyor 10.

FIGS. 26-32 show different configurations of the baffles 116 inside embodiments of the nozzle 110. The baffles 116 and the interior 112 of the nozzle 112 can also be seen in FIG. 32.

Figure 33:
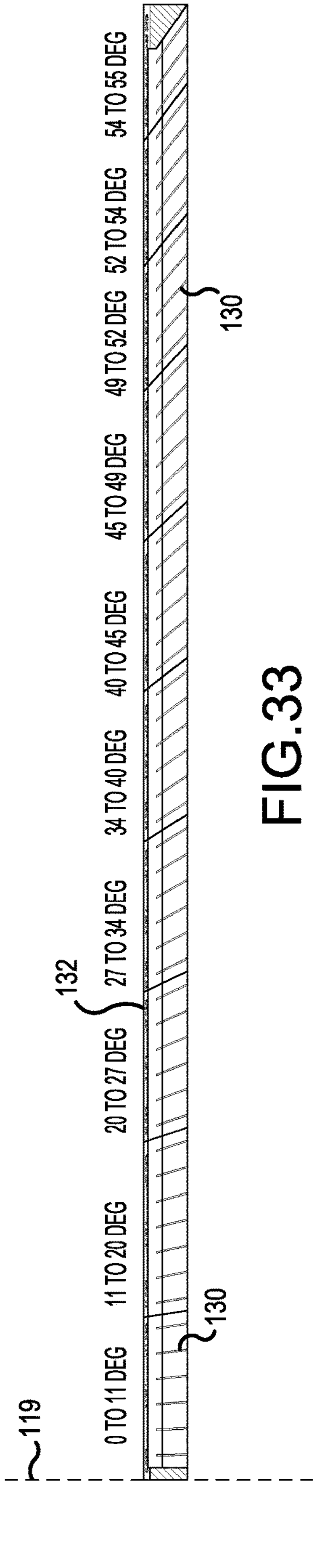
FIG. 33 is a sectional view through a fourth baffle configuration in which the angle of the baffles changes over the length of the air knife.

FIG. 33 shows an alternate arrangement of baffles 130 inside a nozzle 132. As can be seen in FIG. 33, the angle between the baffles 130 and the center plane 119 increase from the center to the each edge of the nozzle 132 (FIG. 33 only shows one half of the nozzle 132). In FIG. 33, the angle of each baffle 130 is different than the angle of an adjacent baffle so that the baffle angle changes from about 0 degrees at the center of the nozzle 130 (that is, air in the center of the baffle is directed straight down in the original air exit direction) and air at the extreme right end of the nozzle 132 is angled at about 55 degrees.

The angle of each baffle can be different, as shown, or several baffles may be angled at the same angle. For example, although not illustrated, a first subset of, e.g., five baffles can be angled at 10 degrees, a next subset of five baffles can be angled at 20 degrees, etc. from the center plane 119. Finally, in some instances, it may be desirable to decrease the angle of the baffles from the center of the nozzle 132 to each end of the nozzle 132 so that, for example, the baffles near the center of the nozzle 132 make an angle of 60 degrees to the original air exit direction and the angle of the baffles at the edges of the nozzle 132 is, e.g., 30 degrees.

Figure 34:
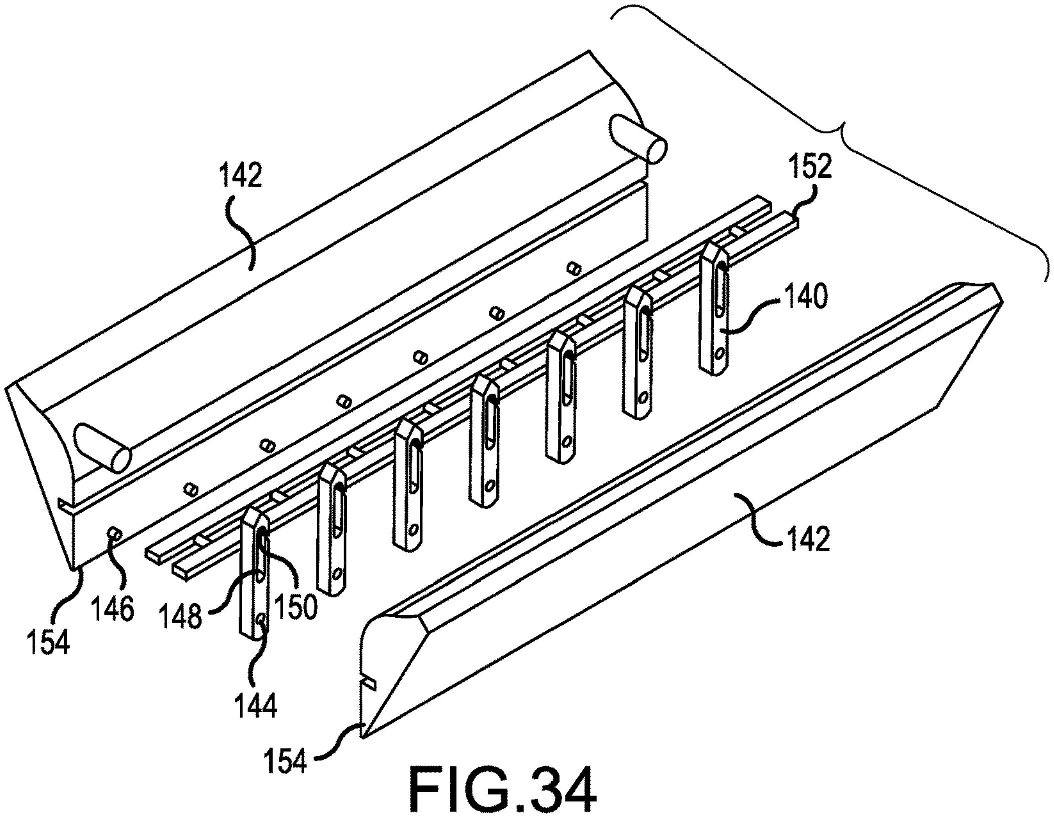
FIG. 34 is an exploded perspective view of a nozzle according to a sixth embodiment in which the angle between the baffles and the nozzle outlet of the air knife is adjustable.
Figure 35:
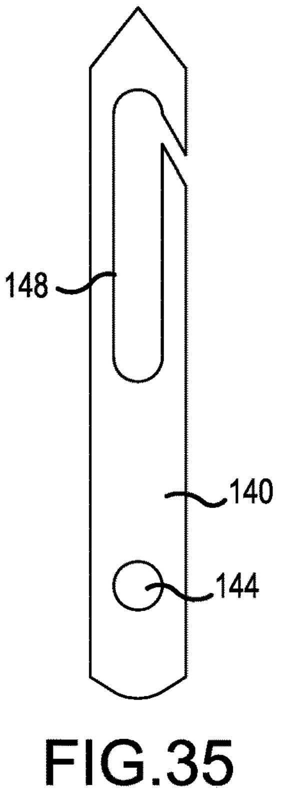
FIG. 35 is an elevational view of one of the baffles of FIG. 34.

FIG. 34 shows a nozzle according to a further embodiment of the disclosure in which the baffles 140 in a nozzle 142 are adjustable from 0 degrees to a maximum angle of, for example, 60 degrees either toward or away from a center plane or an end of a housing. This is accomplished by providing the baffles 140, one of which is shown by itself in FIG. 35, with a bottom opening 144 by which a lower end of the baffle 140 is pivotably mounted to a pin 146 in the interior of the nozzle 142 while a second end of the baffle 140 includes a slot 148 in which a pin 150 of an actuator in the form of a slider 152 is received. Moving the slider 152 back and forth, either manually or by an actuator (not illustrated) changes the angle between the baffles 142 and the exit 154 of the nozzle 142. This may be useful, for example, when it is sometimes desirable to allow air to exit the nozzle 142 in the original air exit direction (with the baffles perpendicular to the nozzle exit 154) and sometimes desirable to direct the air from the nozzle 142 at a positive or negative angle.

The present invention has been described herein in terms of presently preferred embodiments. Additions and modifications to these embodiments will become apparent to persons of ordinary skill in the art upon a reading of the foregoing disclosure. It is intended that all such modifications and additions for a part of the present invention to the extent they fall within the scope of the several claims appended hereto.

What is claimed is:

1. An air knife comprising:

a tubular housing having a first end, a second end spaced from the first end in a longitudinal direction, a side wall extending from the first end to the second end, an interior, and an aperture configured to be connected to a source of pressurized air to increase a pressure of air inside the tubular housing, at least one opening in the side wall, a nozzle at the at least one opening, the nozzle having a nozzle inlet in fluid communication with the at least one opening, a nozzle outlet spaced from the nozzle inlet, and a nozzle interior, and a plurality of baffles in the nozzle interior, each of the baffles having a first end at the nozzle inlet and a second end at the nozzle outlet, wherein the tubular housing is divided into a first half and a second half by an imaginary plane perpendicular to the longitudinal direction, and wherein the second end of each of the baffles is longitudinally offset from the first end of each of the baffles.

2. The air knife according to claim 1, wherein the nozzle interior is tapered between the nozzle inlet and the nozzle outlet such that a width of the nozzle outlet is less than a width of the nozzle inlet.

3. The air knife according to claim 2, wherein the nozzle and the side wall are formed as one piece.

4. The air knife according to claim 2, wherein the nozzle is formed separately from the side wall and is attached to the side wall at a joint.

5. The air knife according to claim 1, wherein the baffles are mounted to a common support, and wherein the common support is mounted to an interior portion of the tubular housing.

6. The air knife according to claim 5, wherein the common support includes a longitudinally extending bead, and wherein the bead is mounted in a longitudinally extending groove in the interior of the tubular housing outside the nozzle.

7. The air knife according to claim 2, wherein a first set of the plurality of baffles between the plane and the first end of the tubular housing is angled in a first direction and a second set of the plurality of baffles between the plane and the second end of the tubular housing is angled in a section direction opposite the first direction.

8. The air knife according to claim 7, wherein an angle between the baffles of a first subset of the first set of the plurality of baffles and the plane is less than an angle between the baffles of a second subset of the first set of the plurality of baffles and the plane, and wherein the first subset is located between the second subset and the plane.

9. The air knife according to claim 2, wherein the baffles of a first set of the plurality of baffles are mutually parallel.

10. The air knife according to claim 2, wherein an angle between a first set of baffles and the plane is from 30° to 60°.

11. The air knife according to claim 1, wherein the baffles and the nozzle are formed as one piece.

12. The air knife according to claim 1, wherein an angle between at least a first subset of the plurality of baffles and the plane is adjustable.

13. The air knife according to claim 12, wherein a first end of a first subset of the plurality of baffles is supported by a fixed pivot, and wherein a second end of the first subset of the plurality of baffles is pivotably mounted to an actuator mounted for movement in a direction perpendicular to the plane.

14. The air knife according to claim 2, including the source of pressurized air.

15. A conveyor comprising:

a movable belt having a support surface;

a drive configured to move the support surface of in a downstream direction;

an air knife, wherein the air knife comprises:

a tubular housing having a first end, a second end spaced from the first end in a longitudinal direction, a side wall extending from the first end to the second end, an interior, and an aperture configured to be connected to a source of pressurized air to increase a pressure of air inside the tubular housing, at least one opening in the side wall, a nozzle at the at least one opening, the nozzle having a nozzle inlet in fluid communication with the at least one opening, a nozzle outlet spaced from the nozzle inlet, and a nozzle interior, and a plurality of baffles in the nozzle interior, each of the baffles having a first end at the nozzle inlet and a second end at the nozzle outlet, wherein the tubular housing is divided into a first half and a second half by an imaginary plane perpendicular to the longitudinal direction, wherein the second end of each of the baffles is longitudinally offset from the first end of each of the baffles, wherein the nozzle interior is tapered between the nozzle inlet and the nozzle outlet such that a width of the nozzle outlet is less than a width of the nozzle inlet, and wherein the air knife is mounted over the support surface such that the longitudinal direction of the tubular housing is perpendicular to the downstream direction and the nozzle outlet faces the support surface so that air emitted from the nozzle outlet is directed against the support surface.

16. An air knife comprising:

a tubular housing having a first end, a second end spaced from the first end in a longitudinal direction, a side wall extending from the first end to the second end, an interior, and an aperture configured to be connected to a source of pressurized air to increase a pressure of air inside the tubular housing, at least one opening in the side wall, a nozzle at the at least one opening, the nozzle having a nozzle inlet in fluid communication with the opening, a nozzle outlet spaced from the nozzle inlet, and a nozzle interior, and a plurality of baffles in the nozzle interior, wherein the tubular housing is divided into a first half and a second half by a plane perpendicular to the longitudinal direction, and wherein the baffles are configured such that when the pressure of the air inside the tubular housing is greater than a pressure of air outside the tubular housing air exits the nozzle outlet at an acute angle to the plane.

17. The air knife according to claim 16, wherein the baffles are configured such that the air exits the nozzle outlet in a direction away from the plane.

18. The air knife according to claim 17, wherein the baffles are configured such that air exits the nozzle outlet at a first angle at a location a first distance from the plane and at a second angle at a location a second distance from the plane, the second distance being different than the first distance.

19. The air knife according to claim 16, wherein the acute angle at which the air exits the nozzle outlet is adjustable.

20. A conveyor comprising:

a movable belt having a support surface;

a drive configured to move the support surface of in a downstream direction;

an air knife, wherein the air knife comprises:

a tubular housing having a first end, a second end spaced from the first end in a longitudinal direction, a side wall extending from the first end to the second end, an interior, and an aperture configured to be connected to a source of pressurized air to increase a pressure of air inside the tubular housing, at least one opening in the side wall, a nozzle at the at least one opening, the nozzle having a nozzle inlet in fluid communication with the opening, a nozzle outlet spaced from the nozzle inlet, and a nozzle interior, and a plurality of baffles in the nozzle interior, wherein the tubular housing is divided into a first half and a second half by a plane perpendicular to the longitudinal direction, wherein the baffles are configured such that when the pressure of the air inside the tubular housing is greater than a pressure of air outside the tubular housing air exits the nozzle outlet at an acute angle to the plane, and wherein the air knife is mounted over the support surface such that the longitudinal direction of the tubular housing is perpendicular to the downstream direction and the nozzle outlet faces the support surface so that air emitted from the nozzle outlet is directed against the support surface.

* * * * *